(12) United States Patent
Takahashi

(10) Patent No.: US 12,095,815 B2
(45) Date of Patent: Sep. 17, 2024

(54) MONITORING APPARATUS, MONITORING METHOD, AND PROGRAM

(71) Applicant: NEC Corporation, Tokyo (JP)

(72) Inventor: Yusuke Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 916 days.

(21) Appl. No.: 17/054,666

(22) PCT Filed: May 14, 2018

(86) PCT No.: PCT/JP2018/018476
§ 371 (c)(1),
(2) Date: Nov. 11, 2020

(87) PCT Pub. No.: WO2019/220480
PCT Pub. Date: Nov. 21, 2019

(65) Prior Publication Data
US 2021/0120037 A1  Apr. 22, 2021

(51) Int. Cl.
*H04L 9/40* (2022.01)
*G06F 21/62* (2013.01)

(52) U.S. Cl.
CPC ...... *H04L 63/1491* (2013.01); *G06F 21/6218* (2013.01); *H04L 63/1416* (2013.01); *H04L 63/1425* (2013.01)

(58) Field of Classification Search
CPC .......... H04L 63/1491; H04L 63/1416; H04L 63/1425; H04L 2463/146; G06F 21/6218; G06F 21/552; G06F 21/567; G06F 21/577
See application file for complete search history.

(56) References Cited

U.S. PATENT DOCUMENTS

| | | | |
|---|---|---|---|
| 6,124,616 A * | 9/2000 | Dennison | H01L 21/823807 257/376 |
| 2009/0157936 A1* | 6/2009 | Goss | G06F 21/74 713/300 |
| 2010/0125683 A1* | 5/2010 | Soeda | G06F 11/3466 710/19 |
| 2011/0145926 A1 | 6/2011 | Dalcher et al. | |
| 2013/0257902 A1 | 10/2013 | Hasuike et al. | |
| 2017/0272466 A1 | 9/2017 | Kakumaru | |
| 2018/0034835 A1* | 2/2018 | Iwanir | G06F 21/565 |

(Continued)

FOREIGN PATENT DOCUMENTS

| | | |
|---|---|---|
| JP | H09-146762 A | 6/1997 |
| JP | 2008-306610 A | 12/2008 |

(Continued)

OTHER PUBLICATIONS

Japanese Office Action for JP Application No. 2020-519212 mailed on Jan. 18, 2022 with English Translation.

(Continued)

*Primary Examiner* — Abiy Getachew

(57) ABSTRACT

A monitoring apparatus comprises a specifying part, a storing part, and a restoring part. The specifying part specifies an access source. The storing part stores changed item(s) in the environment caused by the activity of the access source. The restoring part restores an environment that is referred to when responding to an operation(s) of the access source based on the changed item(s) of the environment stored by the storing part.

11 Claims, 7 Drawing Sheets

(56) References Cited

U.S. PATENT DOCUMENTS

2018/0332061 A1* 11/2018 Terada .................. G06F 21/552
2019/0124118 A1* 4/2019 Swafford ................ G06F 21/84

FOREIGN PATENT DOCUMENTS

| | | |
|---|---|---|
| JP | 2009-104540 A | 5/2009 |
| JP | 2011-248419 A | 12/2011 |
| JP | 2013-009185 A | 1/2013 |
| JP | 2013-514594 A | 4/2013 |
| JP | 2013-210911 A | 10/2013 |
| JP | 2014-238669 A | 12/2014 |
| JP | 2015-191344 A | 11/2015 |
| WO | 2016/031103 A1 | 3/2016 |
| WO | 2016/042587 A1 | 3/2016 |

OTHER PUBLICATIONS

Yin Minn Pa Pa et al., "IoTPOT: analysing the rise of IoT compromises", in 9th USENIX Workshop on Offensive Technologies (WOOT 15), Aug. 10-11, 2015, Washington, D.C.

International Search Report for PCT Application No. PCT/JP2018/018476, mailed on Aug. 7, 2018.

Kento Nomiyama et al., "Attack Detection and Defense for Web Applications", Collection of Papers of Computer Security Symposium 2017, Oct. 16, 2017, pp. 172-177, Information Processing Society of Japan.

* cited by examiner

FIG. 3

| ACCESS SOURCE | DISK IMAGE |
|---|---|
| NEWCOMER | BASE IMAGE |
| 213.233.XXX.XXX | IMAGE A |
| 105.159.XXX.XXX | IMAGE B |
| ⋮ | ⋮ |

FIG. 7

| MONITORING APPARATUS ID | ACCESS SOURCE | DISK IMAGE |
|---|---|---|
| 1 | NEWCOMER | BASE IMAGE |
| 2 | 213.233.XXX.XXX | IMAGE A |
| 3 | 105.159.XXX.XXX | IMAGE B |
| ⋮ | ⋮ | ⋮ |

# MONITORING APPARATUS, MONITORING METHOD, AND PROGRAM

This application is a National Stage Entry of PCT/JP2018/018476 filed on May 14, 2018, the contents of all of which are incorporated herein by reference, in their entirety.

FIELD

The present invention relates to a monitoring apparatus, monitoring method, and program.

BACKGROUND

There is a method of observing the threat of real cyber attacks by intentionally disclosing machines (servers) set in a vulnerable environment to the Internet. These machines are called honeypots, and various honeypots have been researched and developed specifically for the cyber attacks to be observed.

Honeypots can be classified into two types: low interaction and high interaction. Low interaction honeypots are honeypots that are subject to cyber attacks by emulating the protocols and applications for which cyber attacks are to be observed. High interaction honeypots are the ones that receive the cyber attacks to be observed by using an actual operating system (OS) or application.

Low interaction honeypots are subject to cyber attacks in a preconfigured environment. Here, few of the published honeypots take continuous attacks into account. Therefore, every time a cyber attack occurs, the cyber attack is received in a preconfigured environment, thus, it can be perceived as a honeypot by the attacker who continuously attacks.

In addition, high interaction honeypots are often required to be periodically restored to a clean state to prevent themselves from being involved in cyber attacks. Therefore, even in the case of a high interaction honeypot, an attacker who continuously attacks a high interaction honeypot may perceive it as a honeypot.

In a high interaction honeypot, there is a thought on a possibility that a honeypot can be operated in such a way that no cleanup is required by implementing appropriate access control to prevent the honeypot from being involved in a cyber attack. In this case, it is possible that attacker A's attack result may affect attacker B who is not related to attacker A because all traces of the cyber attack remain in the honeypot.

Literature cited in Citation List (NPL 1) discloses a honeypot for observing a cyber attack. NPL 1 discloses an implementation that accumulates the results of an access source operation performed on Linux (registered trademark, hereinafter the same) on a sandbox and returns the accumulated results for similar operations.

[NPL 1]
Yin Minn Pa Pa, S. Suzuki, K. Yoshioka, T. Matsumoto, T. Kasama, and C. Rossow, "IoTPOT: analysing the rise of IoT compromises" in 9th USENIX Workshop on Offensive Technologies (WOOT 15), 2015

SUMMARY

The disclosure of the above literature (NPL 1) cited in Citation List is incorporated herein by reference thereto. The following analysis has been made by the present inventor.

As described above, NPL 1 discloses a honeypot that accumulate results of an accessor's operations and returns the accumulated result responsive to a similar operation. However, even the same command (a Linux command) may have different results depending on the timing of execution. For example, the result of the 1s command (a command to display the contents of a file or directory) is different before and after a file A is downloaded to a honeypot. Concretely, a result before the download does not include the file A, but a result after the download includes the file A.

In the NPL 1, since the honeypot returns the same result for the same operation each time, the change in the file system due to the file download is not reflected in the result, and the attacker may perceive that the target of the attack is a honeypot. In other words, the attacker may perceive that the target of the attack is a honeypot based on an unnatural situation where the file system of the honeypot remains not changed.

It is a main purpose of the present invention to provide a monitoring apparatus, monitoring method, and program that contribute to preventing an attacker from perceiving that the apparatus is a honeypot by an attacker who continuously attacks.

According to a first aspect of the present invention, there is provided a monitoring apparatus, comprising: a specifying part that specifies an access source; a storing part that stores changed item(s) of environment caused by activities of the access source; and a restoring part that restores the environment that is referred to when responding to operations from the access source based on the changed item(s) of the environment stored by the storing part.

According to a second aspect of the present invention, there is provided a method of monitoring performed in a monitoring apparatus, the method comprising: specifying an access source; storing changed item(s) of environment caused by activities of the access source; and restoring the environment that is referred to when responding to operations from the access source based on the changed item(s) of the environment stored.

According to a third aspect of the present invention, there is provided a program, executed by a computer that performs processings of: specifying access source; storing changed item(s) of environment caused by activities of the access source; and restoring the environment that is referred to when responding to operations from the access source based on the changed item(s) of the environment stored.

The above-mentioned program can be recorded in a computer-readable storage medium. The storage medium may be a non-transient medium such as a semiconductor memory, a hard disk, a magnetic recording medium, or an optical recording medium. The present invention can be embodied as a computer program product.

According to individual aspects of the present invention and disclosure, there is provided a monitoring apparatus, a monitoring method and a program that contribute to preventing the apparatus from being perceived as a honeypot by an attacker who continuously attacks.

BRIEF DESCRIPTION OF THE DRAWINGS

FIG. 3 illustrates a diagram to explain an example of an environment DB table for storing change history as a disk image.

FIG. 7 illustrates a diagram to explain an example of an environment DB table for storing change history as a disk image.

PREFERRED MODES

First, an outline of an exemplary embodiment will be described. In the following outline, various components are attached with reference signs for the sake of convenience. Namely, the following reference signs are merely used as examples to facilitate understanding of the outline. Thus, the disclosure is not limited to the description of the following outline. In addition, connecting lines between blocks in each figure include both bidirectional and unidirectional. One-way arrow schematically shows a flow of a main signal (data) and does not exclude bidirectionality. Also, in a circuit diagram, a block diagram, an internal configuration diagram, a connection diagram, etc., there are an input port and an output port at input end and output end of connection line respectively, although not explicitly disclosed. The same applies for an I/O interface.

Figure 1:
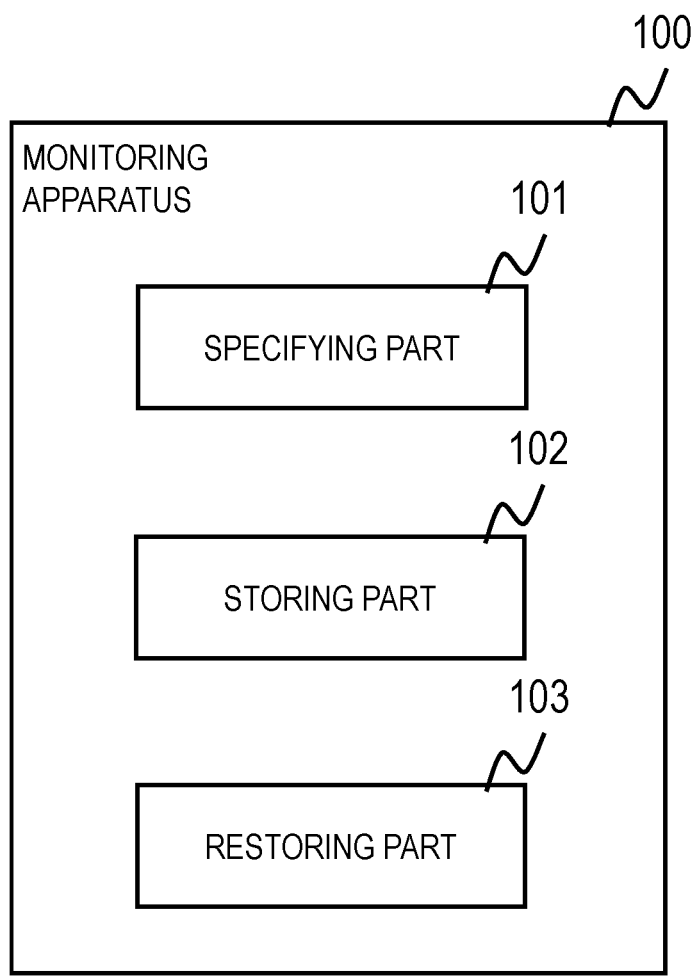
FIG. 1 illustrates an outline of an exemplary embodiment.

A monitoring apparatus 100 according to an exemplary embodiment includes a specifying part 101, a storing part 102, and an restoring part 103 (see FIG. 1). The specifying part 101 specifies an access source. The storing part 102 stores changed item(s) of environment caused by activities of the access source. The restoring part 103 restores the environment that is referred to when responding to operations from the access source based on the changed item(s) of the environment stored by the storing part.

The above monitoring apparatus 100 keeps the changed item(s) in the environment (file system) caused by the activities of the access source for each access source, and provides the file system reflecting the past changed item(s) to the access source when the access source is the same. As a result, one can monitor many activities by the attacker to avoid being perceived as a honeypot by the attacker who continuously attacks the file system.

Hereinafter, a concrete exemplary embodiment will be described in more detail with reference to the drawings. In the exemplary embodiment, like reference characters refer to like components, and description thereof will be omitted.

First Exemplary Embodiment

A first exemplary embodiment will be described in more detail with reference to the drawings.

[Configuration Description]

Figure 2:
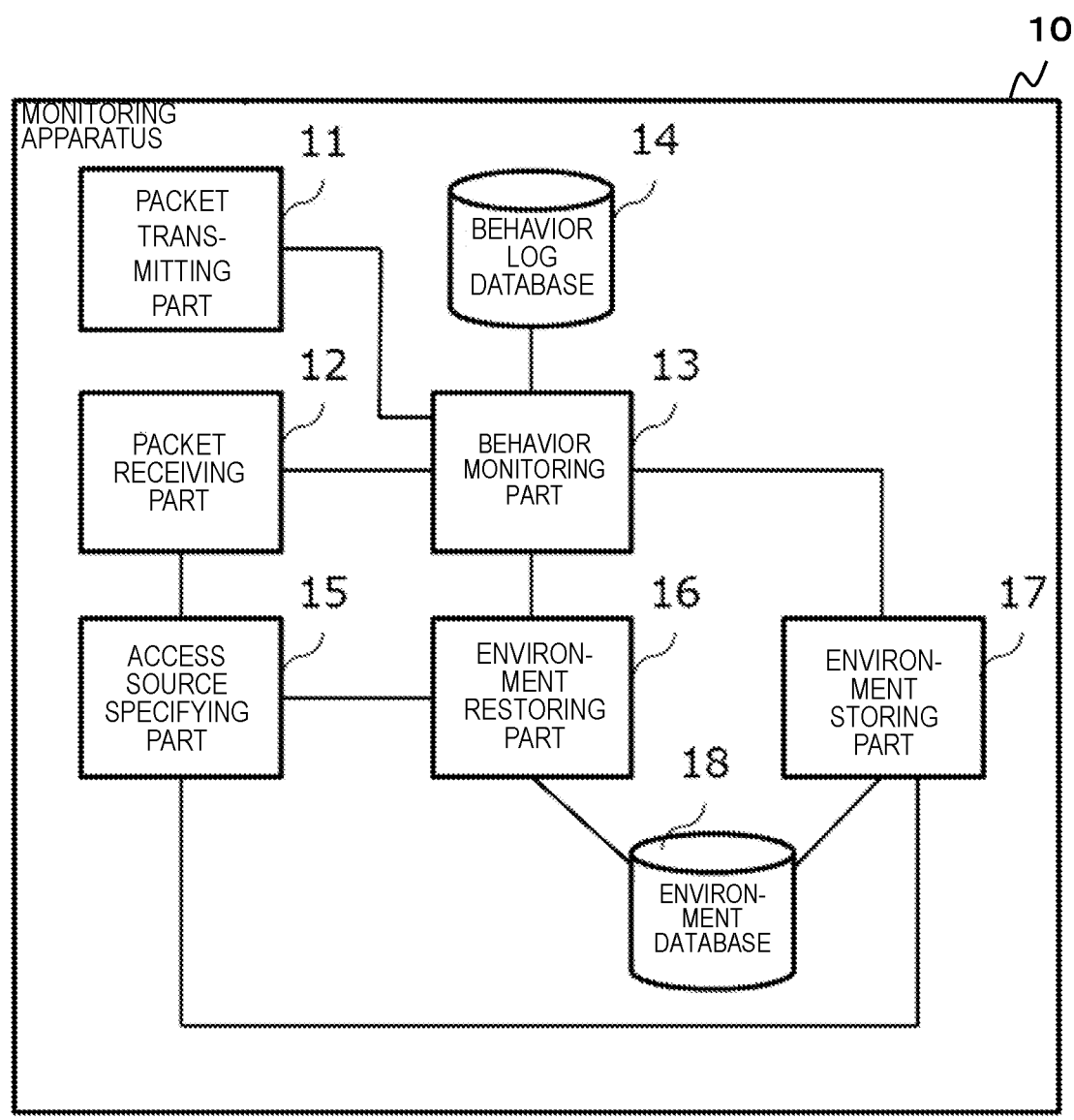
FIG. 2 illustrates a schematic diagram to explain an example of an internal configuration of a monitoring apparatus according to a first exemplary embodiment.

FIG. 2 illustrates a schematic diagram to explain an example of an internal configuration of a monitoring apparatus according to the first exemplary embodiment. A monitoring apparatus 10 according to the first exemplary embodiment includes a packet transmitting part 11, a packet receiving part 12, a behavior monitoring part 13, a behavior log database (database; DB) 14, an access source specifying part 15, an environment restoring part 16, an environment storing part 17, and an environmental database (DB) 18.

The packet transmitting part 11 is connected to the behavior monitoring part 13 and is a means (module) that sends communication packets to an access source connected from the outside.

The packet receiving part 12 is connected to the behavior monitoring part 13, and the communication packets received from the outside are handed over to the behavior monitoring part 13.

The behavior monitoring part 13 accepts and responds to operations from the access source and also monitors the activity of the access source. Concretely, the behavior monitoring part 13 processes the communication packets received upon operation of an operating system (OS) or service to be monitored by the monitoring apparatus 10. In doing so, the behavior monitoring part 13 responds to operations from the access source based on the environment (file system) provided by the environment restoration part 16. The behavior monitoring part 13 also has a function to record the contents of the received communication packets and the processing results as a log.

If, as a result of processing the communication packets by the behavior monitoring part 13, it is determined that the behavior affects the file system, the behavior monitoring part 13 hands over information about the behavior that affects the file system to the environment storing part 17.

Behaviors that affect the file system include file creation, file download, file deletion, file modification, directory creation, directory deletion, and software configuration (setting) changes. Of course, the above behaviors are not intended to limit the behavior that affects the file system, but they are examples.

The behavior monitoring part 13 may be low interaction or high interaction that emulates an OS or service. In other words, the behavior monitoring part 13 can be realized with an actual (existing) OS or service.

Examples of low interaction honeypots are Dionaea and Cowrie or the like. An example of a high interaction honeypot is a general-purpose OS such as Linux, etc. with a remote desktop or SSH (Secure SHell) service running on it.

Further, the log recording function of the behavior monitoring part 13 can be realized by a function attached to a low interaction or high interaction tool or by separately installing a tool for log recording in the monitoring apparatus 10. The above specific example is merely an example, and other means may be used.

The behavior log database (DB) 14 records the contents of the behavior monitoring part 13 and its results. The format of the log depends on a tool used in the behavior monitoring part 13.

The access source specifying part 15 is a means that specifies (identifies) the access source. More concretely, the access source specifying part 15 generates a value that identifies the access source from a feature of a packet received by the packet receiving part 12 and passes it to the environment restoring part 16. In other words, the access source specifying part 15 generates information for specifying the identity of the access source using information that can be passively ascertained (grasped) from the communication protocol used by the access source at the time of connection and passes it to the environment restoring part 16. Examples of features that identify the access source include the IP (Internet Protocol) address of the access source and the library version used by a client, or the like.

The environment database 18 stores changed item(s) to the file system (the environment in which the access source is operating) for each access source. Concretely, the environment database 18 stores the change history of the file system for each access source. The format for saving the change history can be realized as a disk image or a table recording newly created files and deleted files, or the like.

FIG. 3 shows an example of a table in environment database 18 for storing change history as a disk image. Referring to FIG. 3, the table in environment database 18 has information about at least the access source and the disk image which reflects the file system changes made by the access source.

It is also preferred to record the information of the base image as a file system for an access source without a connection. The "newcomer" shown in FIG. 3 indicates an access source for which there is no record of the corresponding access source, i.e., an access source that has been accessed for the first time, and indicates that the file system of the base image is used for the access source in question. In FIG. 3, the IP address is used as the identification information of the access source.

Now return to FIG. 2. The environment storing part 17 is a means that stores changes in the environment caused by the activities of the access source. More concretely, the environment storing part 17 reflects the behavior that affects the file system, observed by the behavior monitoring part 13, in the file system. The environment storing part 17 stores the identification information of the access source and the changed item(s) in the file system in mutual correspondence between the identification information of the access source and the changed item(s) in the file system in the environment database 18 so that the environment can be restored by the environment restoring part 16 according to the access source determined by the access source specifying part 15. The environment storing part 17 stores the changed item(s) of the file system caused by the activity of the access source in the environment database 18 for each access source.

The function of the environment storing part 17 can be achieved by saving the disk image as it is when the change history is stored as a disk image. In other words, the environment storing part 17 may store the file system reflecting the activity of the access sources as a disk image in the environment database 18 after completion of the activity of the access source.

Alternatively, the environment storing part 17 may store the change history by a method such as saving a difference from the base image. In other words, the environment storing part 17 may store the changed item(s) in the file system from the base image caused by the activity of the access source after the end of the activity of the access source as a disk image in the environment database 18.

Alternatively, the environment storing part 17 may store information about newly created, modified, and deleted files when, for example, the change history is stored as a file rather than a disk image. In other words, the environment storing part 17 may store information about files on the file system that has been changed by the activity of the access source after the activity of the access source has ended in the environment database 18.

With respect to the timing of saving the changed item(s) of the file system, the environment storing part 17 may store the changed item(s) of the file system sequentially, or it may store the differences after the session is disconnected in comparison to the file system at the start.

The environment restoring part 16 restores the environment (file system) referred to when responding to the operation of the access source based on the changed item(s) stored by the environment storing part 17. More concretely, the environment restoring part 16 investigates whether or not the access source has a history of connecting to its own apparatus (monitoring apparatus 10) in the past based on the value identifying the access source obtained from the access specifying source part 15.

If there was no history of access, the environment restoring part 16 hands over the file system at default (e.g., the base image shown in FIG. 3) to the behavior monitoring part 13.

If there is a history of access, the environment restoring part 16 restores the file system reflecting the past changed item(s) of the file system and hands it over to the behavior monitoring part 13. For example, the environment restoring part 16 reflects the change history of the file system on the base image and hands it over to the behavior monitoring part 13.

Thus, the environment restoring part 16 restores the file system corresponding to the access source determined by the access source specifying part 15 from the information recorded in the environment database 18 and provides the file system to the behavior monitoring part 13. In doing so, the environment restoring part 16 provides the environment for the first access (the base image) to the behavior monitoring part 13 in the case of a first access from the access source. Furthermore, the environment restoring part 16 provides the environment based on the changed item(s) of the stored environment to the behavior monitoring part 13 when the access from the access source is the second or later access.

With respect to storing the change history, if the file is stored as a newly created file or a deleted file, the period of time to go back with respect to the file system changes can be achieved with all the history existing in the environment database 18, or it can be achieved by specifying a range, such as one month in the past.

[Hardware Configuration]

Next, a hardware configuration of the monitoring apparatus 10 of the first exemplary embodiment will be explained.

Figure 4:
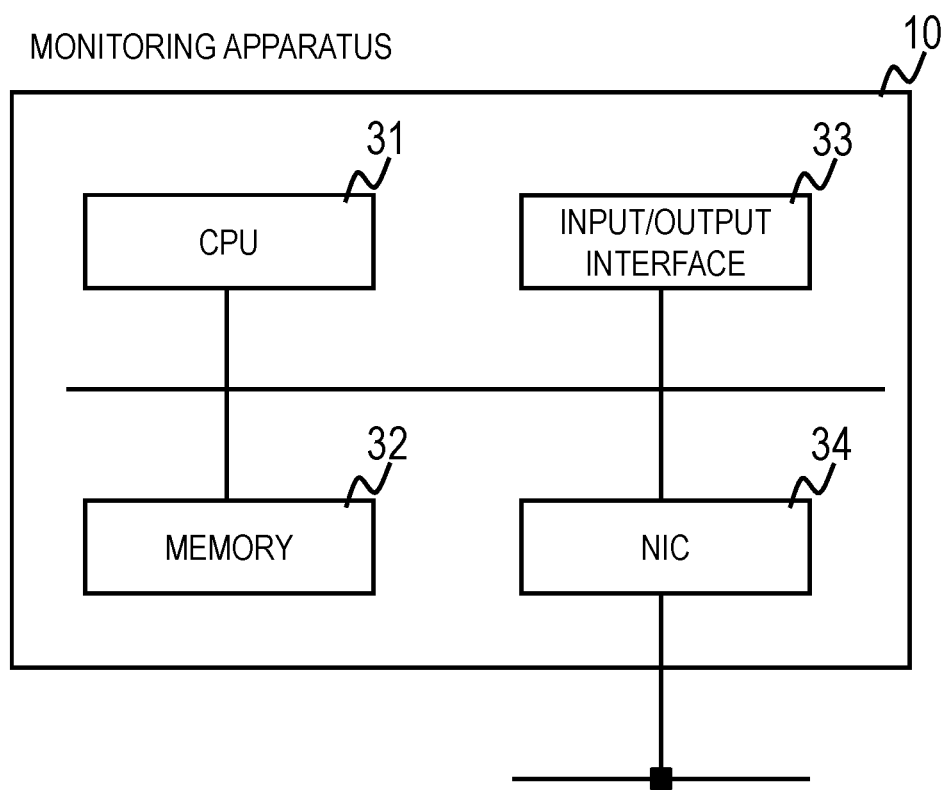
FIG. 4 illustrates a diagram showing an example of a hardware configuration of a monitoring apparatus according to the first exemplary embodiment.

FIG. 4 is a diagram showing an example of the hardware configuration of the monitoring apparatus 10. The monitoring apparatus 10 has the configuration illustrated in FIG. 4. For example, the monitoring apparatus 10 includes a CPU (Central Processing Unit) 31, a memory 32, an input/output interface 33, and a NIC (Network Interface Card) 34, etc., which are interconnected by an internal bus. Note that the configuration shown in FIG. 4 is not intended to limit the hardware configuration of the monitoring apparatus 10. The monitoring apparatus 10 may include hardware not shown.

Memory 32 is a RAM (Random Access Memory), a ROM (Read Only Memory), and a HDD (hard disk drive), or the like.

The input/output interface 33 is a means that interfaces with a display device and an input/output device not shown. The display device is, for example, a liquid crystal display, or the like. The input/output device includes, for example, a display device, an operating device or the like. The operating device is a keyboard, a mouse or the like, for example.

Each of processing modules of the monitoring apparatus 10 is realized, for example, by CPU 31 executing the program(s) stored in the memory 32. In addition, the above program(s) can be downloaded via a network, or updated using a storage medium that stores the program. Furthermore, the above processing module(s) may be realized by a semiconductor chip. In other words, the functions performed by the above processing module(s) can be realized by some kind of hardware and/or software.

[Operational Configuration of the Monitoring Apparatus]

Figure 5:
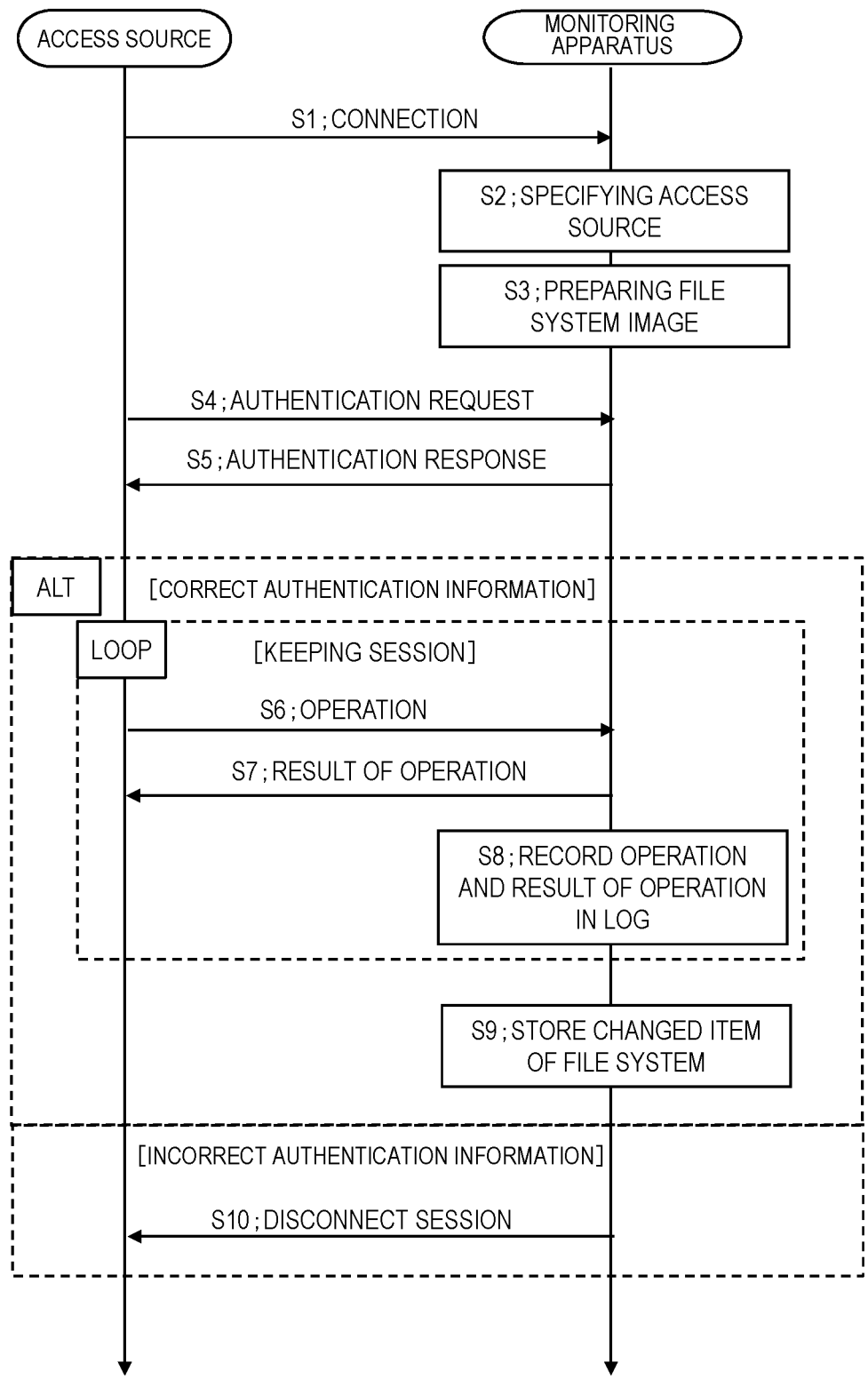
FIG. 5 illustrates a sequence diagram showing an example of the operation of the monitoring apparatus according to the first exemplary embodiment.

FIG. 5 is a sequence diagram showing an example of operation of the monitoring apparatus 10 in the first exemplary embodiment. FIG. 5 shows an example of a case in which authentication is required to log in to the behavior monitoring part 13. Referring to FIG. 5, an example of the operation of the monitoring apparatus 10 will be described.

The monitoring apparatus 10 accepts a connection (access) from an access source (step S1).

The access source specifying part 15 specifies the access source from information (e.g., IP address) that can be passively grasped at the time of connection of the access source (step S2).

The environment restoring part 16 prepares a file system image corresponding to the result of the specifying (step S3) In other words, the environment restoring part 16 prepares a file system image corresponding to the access source and provides it to the behavior monitoring part 13.

The access source sends an authentication request to the monitoring apparatus 10 (step S4).

The monitoring apparatus 10 then returns an authentication response to the access source (step S5).

If the information included in the authentication request in step S4 above is the correct authentication information, the monitoring apparatus 10 permits the access source to log in and stores in the log the behavior after the login (steps S6 to S8). The monitoring apparatus 10 repeats the behavior of steps S6 to S8 above for the duration of the session. In other words, the behavior monitoring part 13 monitors (logs) the behavior of the access source using the file system provided by the environment restoring part 16 according to the result determined by the access source specifying part 15, and returns the operation result to the access source, if necessary.

If the session is disconnected for some reason, the environment storing part 17 stores change(s) of the file system made during the session in question (step S9).

If the authentication information is incorrect, the monitoring apparatus 10 disconnects the session (step S10).

As described above, the monitoring apparatus 10 of the first embodiment keeps a record of changed item(s) of the file system caused by the activity of the access source, and operates as a honeypot that provides an environment reflecting the changed item(s) of the file system made by the access source in the past. As a result, a file system corresponding to the access source is maintained and provided, preventing an attacker from discovering that the monitoring apparatus 10 is a honeypot. If the fact that the monitoring apparatus 10 is a honeypot is not detected, the attacker can perform many activities, and a lot of useful information can be obtained. Thus, in the first exemplary embodiment, the honeypot (the monitoring apparatus 10) simulates or provides a file system that is configured for each connection, so that even an attacker who repeatedly tries to connect cannot easily perceive to be a honeypot.

Second Exemplary Embodiment

Next, a second exemplary embodiment will be described in detail with reference to the drawings. The same sign is used for the same components as in the first exemplary embodiment, and a detailed explanation is omitted.
[Configuration Description]

Figure 6:
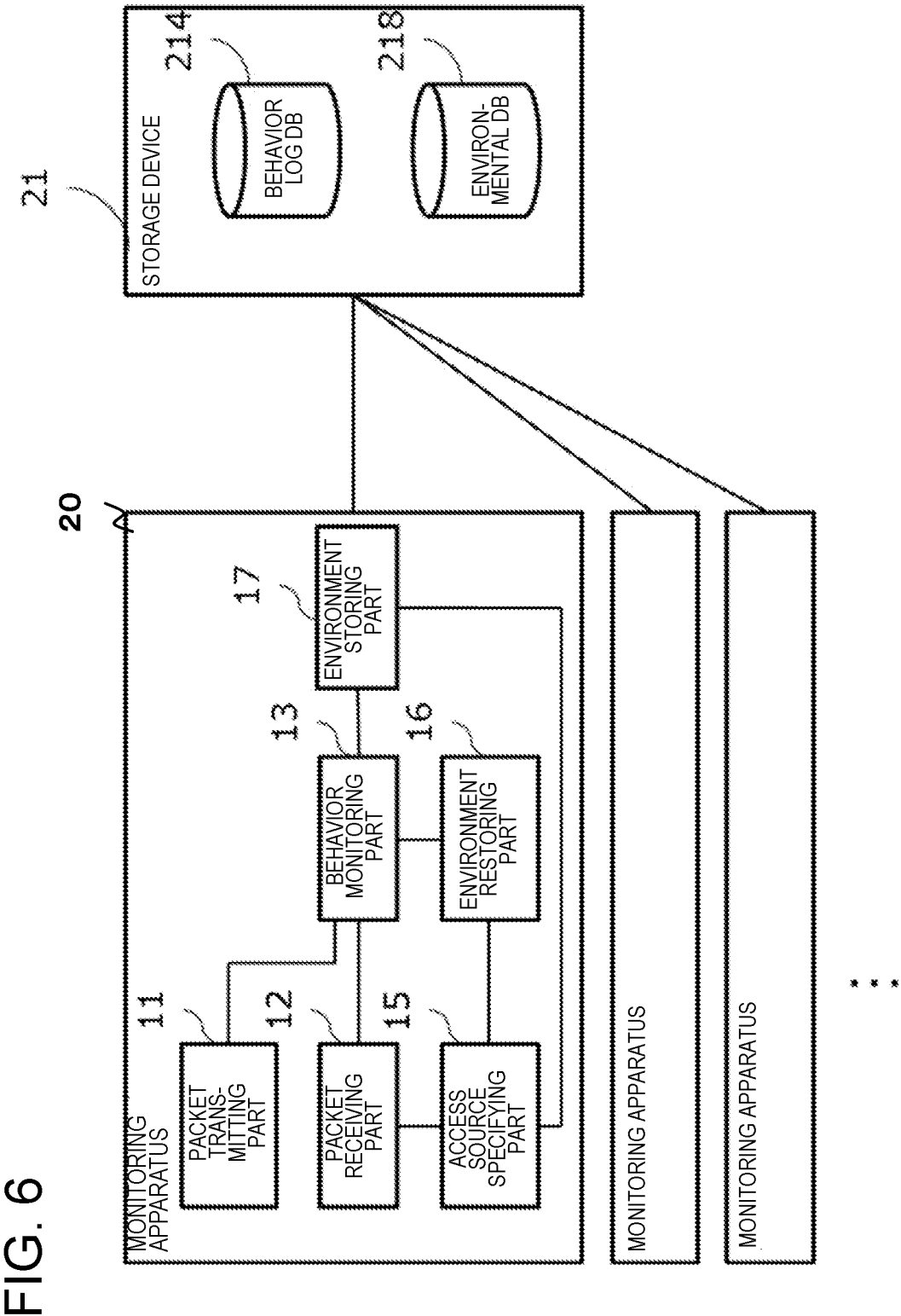
FIG. 6 illustrates a schematic diagram to explain an example of an internal configuration of a monitoring apparatus according to a second exemplary embodiment.

FIG. 6 illustrates an example of an internal configuration (operational configuration) of the monitoring apparatus 20 in the second exemplary embodiment. As shown in FIG. 6, the monitoring apparatus 20 in the second exemplary embodiment does not have an environment log database and an environment database inside it.

The databases corresponding to the behavior log database 14 and the environment database 18 shown in FIG. 2 are separated as a storage device (database server) 21. As shown in FIG. 6, in the second embodiment, it is assumed that a plurality of monitoring apparatuses 20 are present in the system.

The storage device 21 has a behavior log database (DB) 214 and an environment database (DB) 218. The storage device 21 is connected to the monitoring apparatuses 20.

The behavior monitoring part 13 of the monitoring apparatus 20 stores the behavior log in the behavior log database 214, as in the first exemplary embodiment.

The environment storing part 17 and the environment restoring part 16 each access the environment database 218 when saving change(s) of the file system and restoring the file system corresponding to the source of access.

In addition to the elements described in the first exemplary embodiment, information identifying the monitoring apparatus 20 is added to the table possessed by the environment database 218. FIG. 7 is an example of the table possessed by the environment database 218 in the case of saving the change history as a disk image. Referring to FIG. 7, the ID (Identifier) of the monitoring device is added to the table information shown in FIG. 3.

As described above, in the second exemplary embodiment, the databases (behavior log database and environmental database) are managed centrally. As a result, it is easier to reduce the management cost and to analyze the log by multiple monitoring devices than to build the database in each monitoring apparatus.
[Variations]

The configurations of the monitoring apparatuses described in the first and second exemplary embodiments are an example, and are not intended to limit their composition and operation. For example, the monitoring apparatus may include a module that analyzes the behavior log collected by the behavior monitoring part 13 and identifies the attacker.

Further, by installing the above described computer program(s) in the storage portion of the computer, the computer can be made to function as a monitoring apparatus. Further, by having the computer execute the above described computer program(s), the computer can execute a monitoring method for monitoring the activity of the source of access.

Although a plurality of operations (processes) are described in the sequence diagram used in the above-described description, the order of execution of the operations performed in each exemplary embodiment is not limited to the described order. In each exemplary embodiment, the order of the illustrated operations can be changed to the extent that it does not interfere with the content, for example, each operation is executed in parallel. In addition, each of the above described embodiments can be combined to the extent that the contents do not conflict with each other.

The above exemplary embodiments can partially or entirely be described, but not limited to, as follows.
[Mode 1]

See the monitoring apparatus according to the above first aspect.
[Mode 2]

The monitoring apparatus preferably according to mode 1; further comprising a behavior monitoring part that monitors the behavior of the access source while accepting and responding to the operation(s) from the access source, an environmental database that stores the changed item(s) of the environment for each of the access sources; wherein the storing part is configured to store the changed item(s) in the environment for each of the access sources in the environmental database, the restoring part is configured to provide an independent environment to the behavior monitoring part for each of the access sources; and the behavior monitoring part is configured to respond to the operation(s) of the access source based on the environment provided by the restoring part.

[Mode 3]

The monitoring apparatus preferably according to mode 2; wherein the restoring part is configured to provide the environment for a first access to the behavior monitoring part in case of the first access from the access source, and to provide the environment based on the stored changed item(s) in the environment to the behavior monitoring part in case of the second or subsequent access from the access source.

[Mode 4]

The monitoring apparatus preferably according to mode 2 or 3; wherein the storing part is configured to store a file system reflecting the activities of the access source as a disk image in the environmental database after the end of the activities of the access source.

[Mode 5]

The monitoring apparatus preferably according to mode 2 or 3; wherein the storing part is configured to store the changed item(s) of a file system caused by the activities of the access source as a disk image in the environmental database after the end of the activities of the access source.

[Mode 6]

The monitoring apparatus preferably according to mode 2 or 3; wherein the storing part is configured to store information of the changed item(s) of files on a file system caused by the activities of the access source in the environmental database after the end of the activities of the access source.

[Mode 7]

The monitoring apparatus preferably according to any one of modes 4 to 6; wherein the restoring part is configured to restore the file system corresponding to the access source that is specified by the specifying part from the stored information in the environmental database and to provide the file system to the behavior monitoring part.

[Mode 8]

The monitoring apparatus preferably according to any one of modes 1 to 7; wherein the specifying part is configured to generate information to judge the identity of the access source using information that can be grasped from a communication protocol used by the access source at the time of connection.

[Mode 9]

The monitoring apparatus preferably according to any one of modes 2 to 8; further comprising a behavior log database storing a log of contents and results of processing by the behavior monitoring part.

[Mode 10]

The monitoring apparatus according to at least mode 9; wherein the behavior log database and the environmental database are built on an external device.

[Mode 11]

See the monitoring method according to the above second aspect.

[Mode 12]

See the program according to the above third aspect.

Modes 11 and 12 can be expanded in the same way as mode 1 is expanded to modes 2 to 10.

The disclosure of the above NPL is incorporated herein by reference thereto. Variations and adjustments of the exemplary embodiment and examples are possible within the scope of the disclosure (including the claims) of the present invention and based on the basic technical concept of the present invention. Various combinations and selections of various disclosed elements (including the elements in the claims, exemplary embodiment, examples, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been Concretely disclosed.

REFERENCE SIGNS LIST

10, 20, 100 monitoring apparatus
11 packet transmitting part
12 packet receiving part
13 behavior monitoring part
14, 214 behavior log database (DB)
15 access source specifying part
16 environment restoring part
17 environment storing part
18, 218 environmental database (DB)
21 storage device
31 CPU (Central Processing Unit)
32 memory
33 input/output interface
34 NIC (Network Interface Card)
101 specifying part
102 storing part
103 restoring part

What is claimed is:

1. A monitoring apparatus, comprising:
    at least a processor; and
    a memory in circuit communication with the processor,
    wherein the processor is configured to execute program instructions stored in the memory to implement:
    a specifying part that specifies an access source;
    a storing part that stores changed item(s) of an environment caused by activities of the access source;
    a restoring part that restores the environment that is referred to when responding to operation(s) of the access source based on the changed item(s) of the environment stored by the storing part;
    a behavior monitoring part that monitors behavior of the access source while accepting and responding to the operation(s) from the access source; and
    an environment database that stores the changed item(s) of the environment for the access source, wherein
    the storing part is configured to store the changed item(s) of the environment as a disk image in the environment database for the access source as a file system reflecting the activities of the access source after an end of the activities of the access source,
    the restoring part is configured to restore the file system from the stored information in the environment database and to provide the file system to the behavior monitoring part, and
    the behavior monitoring part is configured to respond to the operation(s) of the access source based on the file system provided by the restoring part.

2. The monitoring apparatus according to claim 1, wherein
    the restoring part is configured to provide the environment for a first access to the behavior monitoring part in case of the first access from the access source, and to provide the environment based on the stored changed item(s) in the environment to the behavior monitoring part in case of a second or subsequent access from the access source.

3. The monitoring apparatus according to claim 1, wherein
the storing part is configured to store the changed item(s) of the file system caused by the activities of the access source as the disk image in the environment database after the end of the activities of the access source.

4. The monitoring apparatus according to claim 1, wherein
the storing part is configured to store information of the changed item(s) of file(s) on the file system caused by the activities of the access source in the environment database after the end of the activities of the access source.

5. The monitoring apparatus according to claim 1, wherein
the specifying part is configured to generate information to judge identity of the access source using information that can be grasped from a communication protocol used by the access source at a time of connection.

6. A method of monitoring performed in a monitoring apparatus, the method comprising:
specifying an access source;
storing changed item(s) of an environment caused by activities of the access source;
restoring the environment that is referred to when responding to operation(s) of the access source based on the changed item(s) of the environment stored;
monitoring behavior of the access source while accepting and responding to the operation(s) from the access source; and
storing the changed item(s) of the environment for the access source in an environment database, wherein
the storing stores the changed item(s) of the environment as a disk image in the environment database for the access source as a file system reflecting the activities of the access source after an end of the activities of the access source,
the restoring restores the file system from the stored information in the environment database and provides the file system to the monitoring, and
the monitoring is configured to respond to the operation(s) of the access source based on the file system provided by the restoring.

7. A computer-readable non-transient medium storing a program, wherein the program is executed by a computer to perform processing of:
specifying an access source;
storing changed item(s) of an environment caused by activities of the access source;
restoring the environment that is referred to when responding to operation(s) of the access source based on the changed item(s) of the environment stored;
monitoring behavior of the access source while accepting and responding to the operation(s) from the access source; and
storing the changed item(s) of the environment for the access source in an environment database, wherein
the storing stores the changed item(s) of the environment as a disk image in the environment database for the access source as a file system reflecting the activities of the access source after an end of the activities of the access source,
the restoring restores the file system from the stored information in the environment database and provides the file system to the monitoring, and
the monitoring is configured to respond to the operation(s) of the access source based on the file system provided by the restoring.

8. The method according to claim 6, wherein
the restoring provides the environment for a first access to the behavior monitoring in case of the first access from the access source, and provides the environment based on the stored changed item(s) in the environment to the behavior monitoring in case of a second or subsequent access from the access source.

9. The method according to claim 6, wherein
the storing stores the changed item(s) of the file system caused by the activities of the access source as the disk image in the environment database after the end of the activities of the access source.

10. The method according to claim 6, wherein
the storing stores information of the changed item(s) of file(s) on the file system caused by the activities of the access source in the environment database after the end of the activities of the access source.

11. The method according to claim 6, wherein
the specifying generates information to judge identity of the access source using information that can be grasped from a communication protocol used by the access source at a time of connection.

\* \* \* \* \*